United States Patent [19]

Howard et al.

[11] Patent Number: 5,634,771
[45] Date of Patent: Jun. 3, 1997

[54] PARTIALLY-METALLIC BLADE FOR A GAS TURBINE

[75] Inventors: Walter D. Howard, Cincinnati; Theodore R. Ingling, Loveland, both of Ohio; William E. Bachrach, Bennington, Vt.

[73] Assignee: General Electric Company, Schenectady, N.Y.

[21] Appl. No.: 533,478

[22] Filed: Sep. 25, 1995

[51] Int. Cl.⁶ .................................................. F01D 5/14
[52] U.S. Cl. .................... 416/241 A; 416/229 R; 416/230
[58] Field of Search .............. 416/241 A, 229 R, 416/229 A, 230, 232

[56] References Cited

U.S. PATENT DOCUMENTS

| | | | |
|---|---|---|---|
| 3,637,325 | 1/1972 | Morley | 416/241 A |
| 3,695,778 | 10/1972 | Taylor . | |
| 3,779,338 | 12/1973 | Hayden et al. | 416/229 A |
| 3,903,578 | 9/1975 | Rothman . | |
| 4,118,147 | 10/1978 | Ellis . | |
| 4,594,761 | 6/1986 | Murphy et al. . | |
| 4,643,647 | 2/1987 | Perry | 416/241 A |
| 5,145,320 | 9/1992 | Blake | 416/241 A |
| 5,257,902 | 11/1993 | Atarashi et al. | 416/229 R |
| 5,269,658 | 12/1993 | Carlson et al. | 416/229 R |
| 5,295,789 | 3/1994 | Daguet | 416/241 A |
| 5,429,877 | 7/1995 | Eylon | 416/241 R |

FOREIGN PATENT DOCUMENTS

| | | | |
|---|---|---|---|
| 2165264 | 8/1973 | France | 416/241 A |
| 2753773 | 6/1978 | Germany | 416/241 A |

OTHER PUBLICATIONS

U.S. Patent Application Serial No. 08/257602, filed May 23, 1994 by Jan., Schilling entitled, "Unshrouded Blading for High Bypass Turbofan Engines".
Concurrently filed U.S. Patent Application RD-24620, by J.C. Schilling entitled "Hybrid Blade for a Gas Turbine".

*Primary Examiner*—Edward K. Look
*Assistant Examiner*—Mark Sgantzos
*Attorney, Agent, or Firm*—Douglas E. Erickson; Marvin Snyder

[57] ABSTRACT

A lightweight, impact-resistant gas turbine blade, such as an aircraft engine fan blade, has a metal solid section, composite or structural/syntactic foam segments, and metal solid spars all attached together to define an airfoil portion. The solid section includes the leading edge, blade tip, and trailing edge. The segments together are bounded in part by the solid section near the leading edge, blade tip, and trailing edge. The solid spars separate and are attached to the segments.

10 Claims, 3 Drawing Sheets

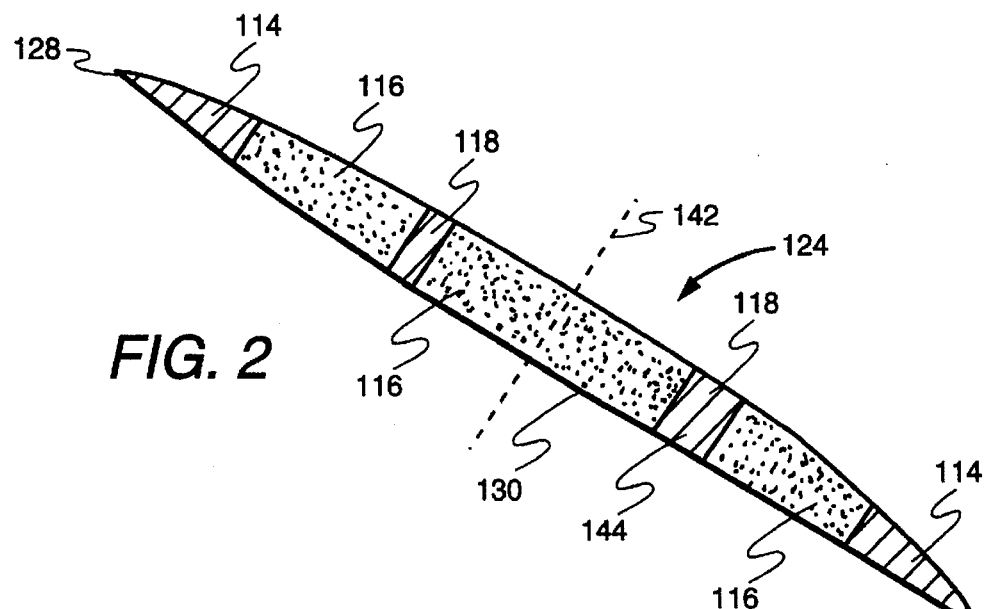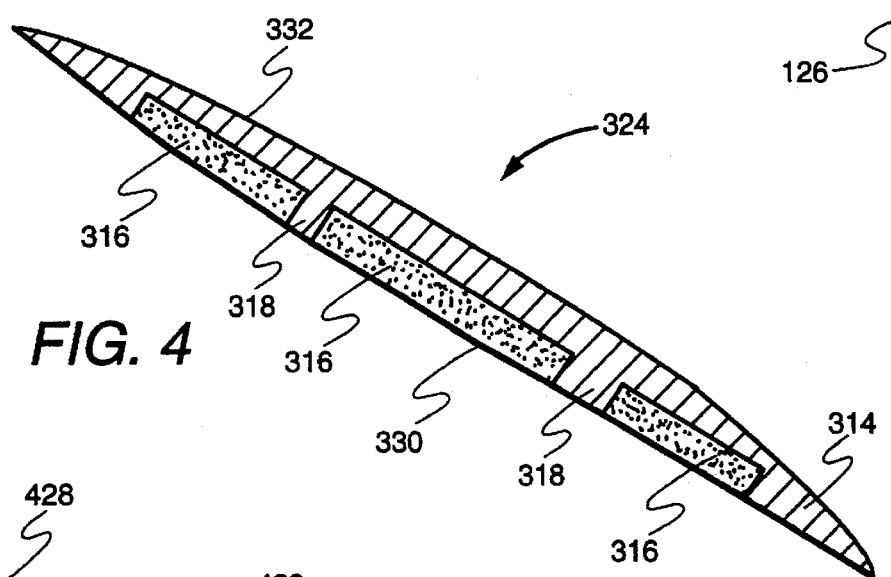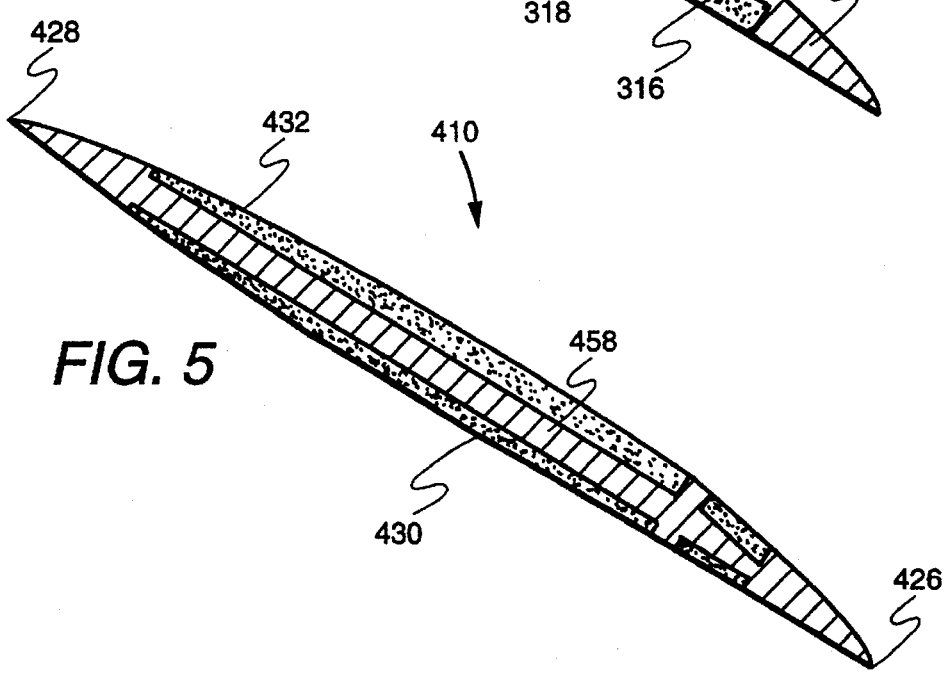

PARTIALLY-METALLIC BLADE FOR A GAS TURBINE

BACKGROUND OF THE INVENTION

The present invention relates generally to gas turbines, and more particularly to a partially-metallic blade for a gas turbine.

Gas turbines include, but are not limited to, gas turbine power generation equipment and gas turbine aircraft engines. A gas turbine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) which is connected by a smaller diameter coaxial shaft to drive the front fan (located forward of the high pressure compressor) and to drive an optional low pressure compressor (located between the front fan and the high pressure compressor). The low pressure compressor sometimes is called a booster compressor or simply a booster.

The fan and the high and low pressure compressors and turbines have gas turbine blades each including an airfoil portion attached to a shank portion. Rotor blades are those gas turbine blades which are attached to a rotating gas turbine rotor disc. Stator vanes are those gas turbine blades which are attached to a non-rotating gas turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counterrotating "stator" vanes are also known. Conventional gas turbine blade designs typically have airfoil portions that are made entirely of metal, such as titanium, or are made entirely of a composite. A "composite" is defined to be a material having any (metal or non-metal) fiber filament embedded in any (metal or non-metal) matrix binder, but the term "composite" does not include a metal fiber embedded in a metal matrix. The term "metal" includes an alloy. An example of a composite is a material having graphite filaments embedded in an epoxy resin. The all-metal blades, including costly wide-chord hollow blades, are heavier in weight which results in lower fuel performance and which requires sturdier blade attachments, while the lighter all-composite blades suffer more response/damage from bird strikes. Known hybrid blades include a composite blade whose leading edge is protected by metal for erosion and bird impact reasons. The fan blades typically are the largest (and therefore the heaviest) blades in a gas turbine aircraft engine, and the front fan blades are the first to be impacted by a bird strike. What is needed is a gas turbine blade, and especially a gas turbine fan blade, which is both lighter in weight and better resistant to damage from bird strikes.

SUMMARY OF THE INVENTION

It is an object of the invention to provide a partially-metallic gas turbine blade.

The gas turbine blade of the invention includes a shank portion, a solid section, a multiplicity of spaced-apart segments, and at least two solid spars. The solid section, segments, and solid spars are attached together to define an airfoil portion. The airfoil portion includes a leading edge, trailing edge, pressure side, suction side, blade root, blade tip, and radial axis. The sides are joined together at the edges to define an airfoil shape having a chord line and a thickness-wise direction, and the blade root is attached to the shank portion. The solid section and the solid spars consist essentially of metal, and the segments consist essentially of composites, structural foams, and/or syntactic foams. The solid section includes partially the pressure and suction sides proximate and including the blade tip from the leading edge to the trailing edge and proximate and including the leading and trailing edges from the blade root to the blade tip. The segments together are bounded in part by the solid section proximate the blade tip, leading edge, and trailing edge. The solid spars separate and are attached to the segments.

Several benefits and advantages are derived from the gas turbine blade of the invention. The solid section of the blade's airfoil portion, consisting essentially of metal, provides resistance to damage from bird strikes in those areas of the blade, such as an aircraft fan blade, most prone to bird strike impact damage. The segments of the blade's airfoil portion, consisting essentially of a composite, a structural foam, and/or a syntactic foam, provides low weight in those areas of the blade, such as an aircraft fan blade, least prone to bird strike impact damage. Such segments are also easily repairable. The solid spars of the blade's airfoil portion, consisting essentially of metal, supply additional flexural and torsional stiffness to the blade and also act as crack/delamination stoppers by dissipating energy during blade impacts from bird strikes.

BRIEF DESCRIPTION OF THE DRAWINGS

The accompanying drawings illustrate several preferred embodiments of the present invention wherein:

FIG. 2 is a schematic view of the airfoil portion of the gas turbine blade of FIG. 1, taken along lines 2—2 of FIG. 1;

FIG. 4 is a view, as in FIG. 2, but of a third preferred embodiment of the gas turbine blade of the invention; and FIG. 5 is a view, as in FIG. 2, but of a fourth preferred embodiment of the gas turbine blade of the invention.

DETAILED DESCRIPTION OF THE INVENTION

Figure 1:
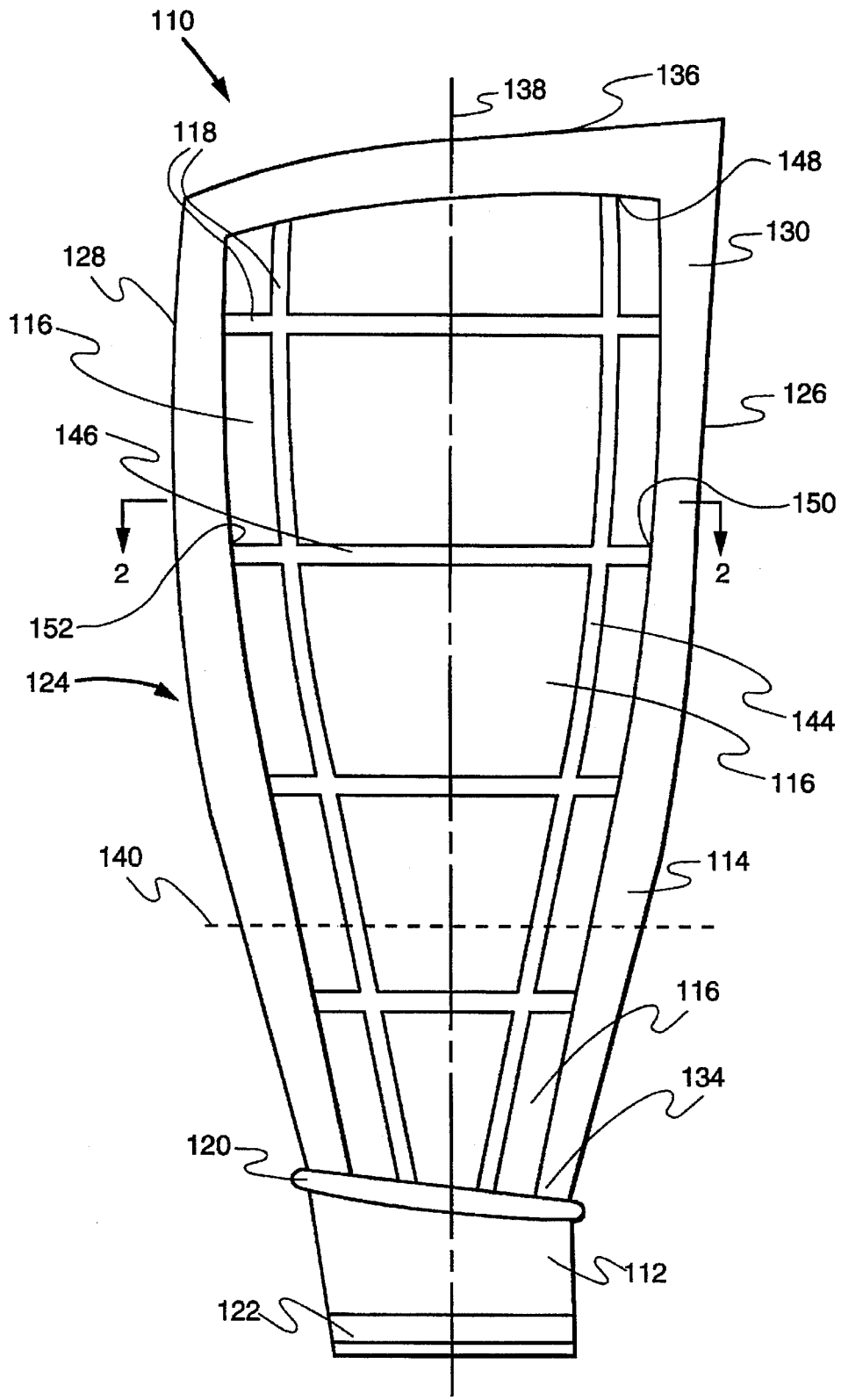
FIG. 1 is a schematic side-elevational view of the pressure side of a first preferred embodiment of the gas turbine blade of the present invention in the form of a gas turbine aircraft engine fan blade.

Referring now to the drawings, wherein like numerals represent like elements throughout, FIGS. 1 and 2 schematically show a first preferred embodiment of the gas turbine blade 110 of the present invention. The gas turbine blade 110 includes a shank portion 112, a solid section 114, a multiplicity of spaced-apart segments 116, and a plurality of solid spars 118. Typically, the shank portion 112 has a blade platform 120, which helps to radially contain the air flow, and a dovetail 122, which attaches to a rotor disc (not shown). The solid section 114, the segments 116, and the solid spars 118 are attached together to define an airfoil portion 124.

The airfoil portion 124 has a leading edge 126, a trailing edge 128, a pressure (concave-shaped) side 130, a suction (convex-shaped) side 132, a blade root 134, a blade tip 136, and a radial axis 138. The sides 130 and 132 are joined together at the edges 126 and 128 to define an airfoil shape having a chord line 140 extending from the leading edge 126 to the trailing edge 128 and having a thickness-wise direction 142 perpendicular to the chord line 140 and extending from the pressure side 130 to the suction side 132. The blade root 134 is attached to the shank portion 112. The radial axis 138 extends outward toward the blade tip 136 and inward toward the blade root 134.

The solid section 114 consists essentially of a metal material, and preferably consists of a metal material. The term "metal" includes an alloy. Preferably, the solid section 114 is a monolithic metal section. In an exemplary embodiment, the metal material consists essentially of (and preferably consists of) titanium. Other choices for the metal material include, but are not limited to, aluminum, cobalt, nickel, or steel. The solid section 114 includes partially the pressure and suction sides 130 and 132 proximate and including the blade tip 136 from the leading edge 126 to the trailing edge 128 and proximate and including the leading and trailing edges 126 and 128 from the blade root 134 to the blade tip 136. It is noted that such described solid section 114 describes a metal blade tip 136 which provides for better tip-rub protection.

The segments 116 consist essentially of (and preferably consist of) a material selected from the group consisting of composites, structural foams, syntactic foams, and mixtures thereof. The term "composite" is defined to be a material having any (metal or non-metal) fiber filament embedded in any (metal or non-metal) matrix binder, but the term "composite" does not include a metal fiber (i.e., fiber filament) embedded in a metal matrix. Preferably, when the segments 116 are composite segments, such composite segments are a layup of discrete composite laminations. In an exemplary embodiment, the composite material consists essentially of (and preferably consists of) carbon fiber filaments embedded in an epoxy (i.e., epoxy resin) matrix binder. Other choices for the composite material include, but are not limited to, fiber-bismaleimide, fiber-polyimide, and other fiber-epoxy thermoset or thermoplastic resins and mixtures thereof. Fiber-filament modulus and orientation are chosen to maintain overall airfoil-portion stiffness to minimize structural binding of the blade under centrifugal and aerodynamic load, as is within the level of skill of the artisan. The term "structural foam" is defined to be a plastic having a cellular core and integral skins. The term "syntactic foam" is defined to be a cellular polymer made by dispersing rigid, microscopic particles in a fluid polymer and then curing it. An example of a syntactic foam is ROHACELL FOAM (a polymethacry The segments 116 together are bounded in part by the solid section 114 proximate the blade tip 136, the leading edge 126, and the trailing edge 128.

The solid spars 118 separate and are attached to the segments 116. The solid spars consist essentially of (and preferably consist of) a metal material. Preferably, the metal material is the same as that of the solid section 114. Preferably, the solid spars 118 include a first spar 144 extending generally radially from the blade root 134 to proximate the blade tip 136 and extending generally thickness-wise from the pressure side 130 to the suction side 132. In an exemplary embodiment, the solid spars 118 include a second spar 146 extending generally chordwise from proximate the leading edge 126 to proximate the trailing edge 128 and extending generally thickness-wise from the pressure side 130 to the suction side 132. In a preferred construction, the first spar 144 has an end 148 attached to the solid section 114 proximate the blade tip 136, and the second spar 146 has two ends 150 and 152 each attached to the solid section 114 proximate a corresponding one of the leading and trailing edges 126 and 128. In the first preferred embodiment, as best seen in FIG. 2, the segments 116 extend generally thickness-wise from the pressure side 130 to the suction side 132. Preferably the solid spars 118 together define a monolithic spar array, and the solid spars 118 and the solid section 114 together define a monolithic metallic array.

Figure 3:
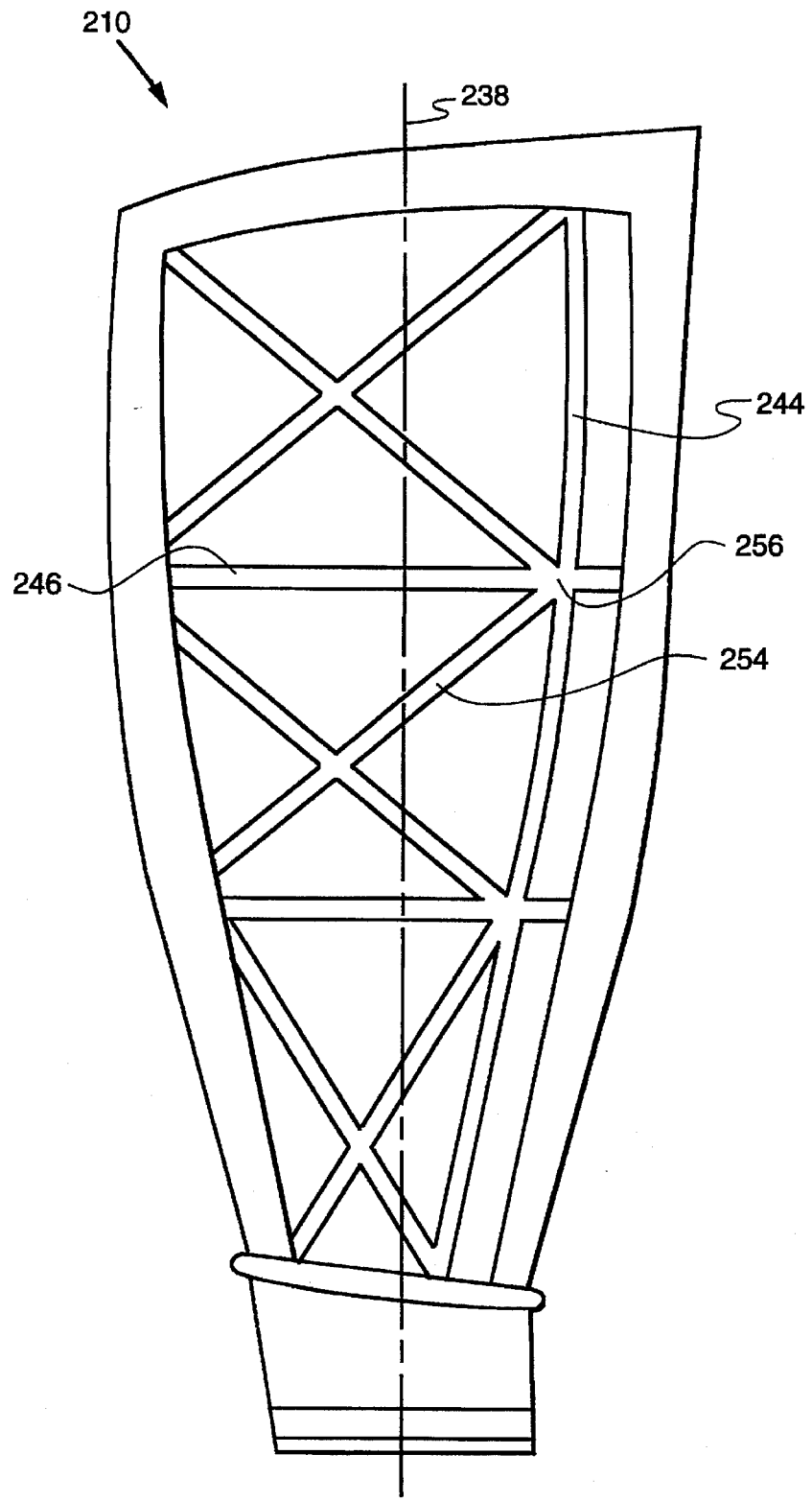
FIG. 3 is a schematic side-elevational view of the pressure side of a second preferred embodiment of the gas turbine blade of the invention.

A second preferred embodiment of the gas turbine blade 210 is generally identical to the previously-described first preferred embodiment of the gas turbine blade 110 with the following addition. In the second preferred embodiment, as seen in FIG. 3, the first and second spars 244 and 246 intersect, and the solid spars include a third spar 254 extending from the intersection 256 at an angle of generally forty-five degrees from the radial axis 238 and extending generally thickness-wise (like the first and second spars 244 and 246) from the pressure side to the suction side.

A third and fourth preferred embodiment of the gas turbine blade 310 and 410 each is generally identical to the previously-described first or second preferred embodiments of the gas turbine blade 110 or 210 with the following differences. In the third preferred embodiment, as seen in FIG. 4, the airfoil portion 324 of the gas turbine blade 310 has its solid section 314 further include entirely the suction side 332 such that the segments 316 are abutted by the solid section 314 towards the suction side 332. Here, all the solid spars 318 extend generally thickness-wise from the pressure side 330 to proximate the suction side 332. In the fourth preferred embodiment, as seen in FIG. 5, the solid spars of the gas turbine blade 410 include a core spar 458 extending generally chordwise from proximate the leading edge 426 to proximate the trailing edge 428, extending generally radially from the blade root to the blade tip, and thickness-wise spaced apart from the pressure and suction sides 430 and 432.

Referring again to the first preferred embodiment of FIGS. 1 and 2, the gas turbine blade 110 rotates in a direction such that the pressure (concave) side 130 passes a reference point before the suction (convex) side 132 passes the same reference point. Thus, the bird impact footprint is primarily over the metallic solid section 114 area of the pressure side 130 near the leading edge 126, followed by the adjoining composite, structural foam, and/or syntactic foam segments 116 area of the pressure side 130. Such composite, structural foam, and/or syntactic foam area provides buckling resistance since it will be in tension, which is best for composites, structural foams, and/or syntactic foams. The following percentages of composite, structural foam, and/or syntactic foam segment 116 material making up the airfoil portion 124 have been determined by engineering analysis through optimizing weight and impact resistance factors.

Preferably, the segments 116 include between generally forty and ninety percent (and desirably between fifty and eighty percent) of the surface area of the pressure side 130 and includes between generally forty and ninety percent (and desirably between fifty and eighty percent) of the volume size of the airfoil portion 124. In an exemplary enablement, the segments 116 include generally seventy percent of the surface area of the pressure side 130 and include generally seventy percent of the volume size of the airfoil portion 124. In a preferred embodiment, the gas turbine blade 110 includes at least four segments 116.

It is preferred that the segments 116 together extend in a general chordwise direction along the pressure side 130 between generally fifteen and ninety-five percent (and desirably between fifty and eighty percent) of the distance along the pressure side 130 between the leading edge 126 and the trailing edge 128. In a preferred embodiment, the segments 116 together extend generally sixty percent of the distance along the pressure side 130 between the leading edge 126 and the trailing edge 128. It is desired that the segments 116 together extend radially between generally sixty and ninety-five percent (and preferably between generally seventy and ninety-five percent) of the distance between the blade root 134 and the blade tip 136. In an exemplary embodiment, the segments 116 together extend radially generally ninety percent of the distance between the blade root 134 and the blade tip 136.

In a favored enablement, the composite (or structural/syntactic foam) material is thermally removable from the solid section 114 at a temperature below the melting point of the metal material. This allows the airfoil portion 124 to be easily repairable should it become damaged due to bird strikes or foreign object impacts. If the airfoil portion is damaged in the composite (or structural/syntactic foam) segments 116, the composite (or structural/syntactic foam) material would be thermally removed, the metal solid section 114 and/or metal solid spars 118 repaired, and new composite (or structural/syntactic foam) material reapplied. Since most of such blade damage is to the lead row of gas turbine blades 110, it is preferred that the airfoil portion 124 is an airfoil portion of a gas turbine aircraft engine fan blade 110 (or the airfoil portion of a gas turbine aircraft engine compressor blade if the engine has no fan). Engineering analysis has shown that the gas turbine blade 110 of the present invention, in the form of a gas turbine aircraft engine fan blade, has a preferred diameter of between generally 45 and 98 inches and a preferred design maximum speed at the blade tip 136 of less than generally 1550 feet per second. Such preferred operating conditions ensure that the blade tip temperature will not exceed the operating temperature of composite materials, such as epoxy, bismaleimide, and polyimide resins (or structural foam or syntactic foam materials) used in the segments 116 of the airfoil portion 124.

Preferred methods for making the gas turbine blade 110 of the invention include, but are not limited to, autoclave, compression mold, and (in the case of composite materials) resin transfer molding. If autoclave is chosen, the metal solid section 114 would act as one side of the tool, thus minimizing tooling. As previously mentioned, in the case of composite materials, fiber-filament modulus and orientation would be chosen to maintain overall airfoil-portion stiffness to minimize structural binding of the blade under centrifugal and aerodynamic load, as is within the level of skill of the artisan.

It is noted that the dovetail 122 of the shank portion 112 can be partially composite on the pressure (concave) side (not shown). Alternatively, the dovetail 122 can have a metal wedge system (also not shown) to positively capture the composite (or structural/syntactic foam) segments 116 and provide a metallic dovetail wear surface. It is further noted that less containment structure for the airfoil portion 124 is required since the composite (or structural/syntactic foam) material will fragment and disband from the metallic solid section 114 under impact.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A gas turbine aircraft engine fan blade comprising: a shank portion; a solid section; a multiplicity of spaced-apart segments; and a plurality of solid spars, wherein said solid section, said segments, and said solid spars are attached together to define a rotatable airfoil portion, and wherein said rotatable airfoil portion includes:

a) a leading edge;
   b) a trailing edge;
   c) a pressure side;
   d) a suction side, said sides joined together at said edges to define an airfoil shape having a chord line extending from said leading edge to said trailing edge and having a thickness-wise direction perpendicular to said chord line and extending from said pressure side to said suction side;
   e) a blade root attached to said shank portion;
   f) a blade tip; and
   g) a radial axis extending outward toward said blade tip and inward toward said blade root, wherein said solid section consists essentially of a metal material, said solid section including partially said pressure and suction sides proximate and including said blade tip from said leading edge to said trailing edge and proximate and including said leading and trailing edges from said blade root to said blade tip, wherein said segments consist essentially of a material selected from the group consisting of composites, structural foams, syntactic foams, and mixtures thereof, said segments together bounded in part by said solid section proximate said blade tip, said leading edge, and said trailing edge, and wherein said solid spars separate and are attached to said segments, said solid spars consisting essentially of a metal material.

2. The gas turbine blade of claim 1, wherein said segments extend generally thickness-wise from said pressure side to said suction side.

3. The gas turbine blade of claim 2, wherein said solid spars include a first spar extending generally radially from said blade root to proximate said blade tip and extending generally thickness-wise from said pressure side to said suction side, and wherein said solid spars include a second spar extending generally chordwise from proximate said leading edge to proximate said trailing edge and extending generally thickness-wise from said pressure side to said suction side.

4. The gas turbine blade of claim 3, wherein said first spar has an end attached to said solid section proximate said blade tip, and wherein said second spar has two ends each attached to said solid section proximate a corresponding one of said leading and trailing edges.

5. The gas turbine blade of claim 3, wherein said first and second spars intersect and wherein said solid spars include a third spar extending from said intersection at an angle of generally forty-five degrees from said radial axis and extending generally thickness-wise from said pressure side to said suction side.

6. The gas turbine blade of claim 1, wherein said solid section further includes entirely said suction side such that said segments are abutted by said solid section towards said suction side.

7. The gas turbine blade of claim 6, wherein said solid spars include a first spar extending generally radially from said blade root to proximate said blade tip and extending generally thickness-wise from said pressure side to proximate said suction side, and wherein said solid spars include a second spar extending generally chordwise from proximate said leading edge to proximate said trailing edge and extending generally thickness-wise from said pressure side to proximate said suction side.

8. The gas turbine blade of claim 7, wherein said first spar has an end attached to said solid section proximate said blade tip, and wherein said second spar has two ends each attached to said solid section proximate a corresponding one said leading and trailing edges.

9. The gas turbine blade of claim 8, wherein said first and second spars intersect and wherein said solid spars include a third spar extending from said intersection at an angle of generally forty-five degrees from said radial axis and extending generally thickness-wise from said pressure side to proximate said suction side.

10. The gas turbine blade of claim 1, wherein said solid spars includes a core spar extending generally chordwise from proximate said leading edge to proximate said trailing edge, extending generally radially from said blade root to proximate said blade tip, and thickness-wise spaced apart from said pressure and suction sides.

* * * * *